United States Patent
Poupyrev et al.

(10) Patent No.: US 7,755,607 B2
(45) Date of Patent: *Jul. 13, 2010

(54) MOBILE APPARATUS HAVING TACTILE FEEDBACK FUNCTION

(75) Inventors: Ivan Poupyrev, Tokyo (JP); Junichi Rekimoto, Tokyo (JP); Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 686 days.

This patent is subject to a terminal disclaimer.

(21) Appl. No.: 11/681,958

(22) Filed: Mar. 5, 2007

(65) Prior Publication Data

US 2007/0146316 A1    Jun. 28, 2007

Related U.S. Application Data

(63) Continuation of application No. 10/351,476, filed on Jan. 27, 2003, now Pat. No. 7,205,978.

(30) Foreign Application Priority Data

Jan. 28, 2002  (JP) ............................. 2002-018228
Jul. 18, 2002  (JP) ............................. 2002-209232

(51) Int. Cl.
       *G09G 5/00*  (2006.01)
(52) U.S. Cl. ...................... 345/156; 345/173; 715/701
(58) Field of Classification Search ................ 345/156, 345/173–181
See application file for complete search history.

(56) References Cited

U.S. PATENT DOCUMENTS

| 4,438,364 A | 3/1984 | Morison |
| 4,667,182 A | 5/1987 | Murphy |
| 5,068,567 A | 11/1991 | Jones |
| 5,245,245 A * | 9/1993 | Goldenberg ................. 310/330 |
| 6,198,206 B1 | 3/2001 | Saarmaa et al. |
| 6,291,930 B1 | 9/2001 | Sager |
| 6,429,846 B2 * | 8/2002 | Rosenberg et al. ........... 345/156 |
| 6,512,323 B2 | 1/2003 | Forck et al. |
| 6,757,947 B2 | 7/2004 | Seipler et al. |
| 2002/0177471 A1 | 11/2002 | Kaaresoja et al. |
| 2003/0016253 A1 | 1/2003 | Aoki et al. |

FOREIGN PATENT DOCUMENTS

| JP | 62-17162 | 2/1987 |
| JP | 63-111521 | 5/1988 |

(Continued)

*Primary Examiner*—Duc Q Dinh
(74) *Attorney, Agent, or Firm*—Oblon, Spivak, McClelland, Maier & Neustadt, L.L.P.

(57) ABSTRACT

A haptic display includes at least one haptic device that can give tactile feedback instead of visible feedback. Each of the haptic devices converts a signal from a signal producing unit into force or tactile pattern. The haptic device does not require a large mass, so that it can be provided on almost any portion or part within the body of a mobile apparatus. For example, the haptic device can be embedded under a touch panel display that constitutes both input and output device. By providing the haptic devices under respective menu/function button areas displayed on the touch panel display, it is possible to stimulate the specific button in response to the user-input-operation, thereby directly providing the tactile feedback to the user's finger touching the corresponding button.

5 Claims, 11 Drawing Sheets

FOREIGN PATENT DOCUMENTS

| | | |
|---|---|---|
| JP | 63-164127 | 10/1988 |
| JP | 63-178364 | 11/1988 |
| JP | 01-257900 | 10/1989 |
| JP | 07-155688 | 6/1995 |
| JP | 07-213997 | 8/1995 |
| JP | 09/173979 | 7/1997 |
| JP | 9-319518 | 12/1997 |
| JP | 2000-200140 | 7/2000 |

* cited by examiner

MOBILE APPARATUS HAVING TACTILE FEEDBACK FUNCTION

CROSS REFERENCES TO RELATED APPLICATIONS

The present application is a continuation application of Ser. No. 10/351,476 filed Jan. 27, 2003, the entire contents of which are incorporated herein by reference. The present document is based on Japanese Priority Documents JP 2002-018228 and JP 2002-209232 filed in the Japanese Patent Office on Jan. 28, 2002 and Jul. 18, 2002, respectively, the entire contents of which being incorporated herein by reference.

BACKGROUND OF THE INVENTION

1. Field of the Invention

The present invention relates to an information processing apparatus having user interface, and in particular to a mobile or handheld type apparatus such as PDA (Personal Digital Assistant), mobile phone, remote controls, and etc. More specifically, the present invention relates to a mobile apparatus that can give user tactile feedback through the user interaction, and particularly pertains to a mobile apparatus that can create a variety of tactile patterns without latency and arbitrary shapes.

The present invention also relates to information processing apparatus that uses pen for data input, such as tablets computers, touch screens and pen input screens.

2. Description of the Related Art

In accordance with recent technological development, various types of computers, such as personal computers (PCs) and personal digital assistants (PDAs) have been developed and are being widely sold and used.

In general, computers have user input device such as keyboard and mouse, and also include output device such as display, speaker and printer. Through output device, computer can give user sensible feedback so as to guide him to a correct operation.

However, user may not be aware of visible feedback by display if he does not look at display screen. Phonetic feedback also may be suppressed by noise.

As computing devices are decreased in size while accommodating more functionality, visual displays are also becoming smaller and using them becomes even more difficult.

Therefore, as a robust feedback means in any working environment, torque based tactile feedback devices have been proposed. Most of the conventional tactile feedback devices use rotating motors with cams. The tactile feedback is generated from the torque when the motor starts and stops. ((1) Yoshie, M., Yano, H., Iwata., Development of non-grounded force display using gyro moments. (Proceedings of Human Interface Society Meeting. 2001. pp. 25-30); (2) Fukui, Y., Nishihara, S., Nakata, K., Nakamura, N., Yamashita, J., Hand-held torque feedback display. (Proceedings of SIGGRAPH01 Abstracts and Applications. 2001. ACM. pp. 192))

The shortcomings of such feedback device is that:
1) They cannot be used into small handheld devices because they require a large mass attached to them.
2) They can create only limited variety of the tactile patterns.
3) Because of the motor inertia, the tactile bandwidth is slow and that is why they have been mostly used as force back device rather than tactile feedback.

The conventional vibration motors, which are widely used into many mobile phones, comprise asymmetric shafts or cams that start vibrating after certain delay time. These actuators have very large latency so that they cannot be used in interactive applications. Only sinusoidal patterns of vibration can be generated using the conventional actuators. In other words, they cannot generate arbitrary pattern.

US published patent application US 2002-0149561 discloses various application examples of the tactile feedback using vibration actuators that utilize magnetic or electrostatic force to cause reciprocal movement of weight.

On the other hand, piezoelectric actuators have been used to directly stimulate the target such as user's hand. However, they generate only local stimulation in a small area of skin, or they use matrix of the piezoelectric actuators (Cholewiak, R. W. and Sherrick, C. E., 1981 A computer-controlled matrix system for presentation to the skin of complex spatiotemproal patterns. Behavioral Research Methods and Instrumentation, 13, 667-673).

Japanese published patent Application JP 11-212725 discloses examples of the tactile feedback method using piezoelectric elements. The piezoelectric elements are formed in a block shape and placed to directly support a surface member of operation unit by which a user input is accepted. The tactile feedback is presented by feeding a high frequency current to each of the piezoelectric elements.

Voice coils have also been used to provide tactile feedback. But they also provide only local vibration, they are relatively large and usually allow for vibrations only within the natural resonant frequency of actuator. In other words, they allow only limited signal shapes. (Fukumoto, M., Toshiaki, S., ActiveClick: Tactile Feedback for Touch Panels. (Proceedings of CHI'2001, Extended Abstracts. 2001. ACM. pp. 121-122.))

There have been a number of matrix based tactile displays that include pins moving and affecting the user hand. Because of the size of such actuators and complexity, they can not be allowed being used into mobile apparatuses (Cholewiak, R. W. and Sherrick, C. E., 1981 A computer-controlled matrix system for presentation to the skin of complex spatiotemproal patterns. Behavioral Research Methods and Instrumentation, 13, 667-673).

Most of the interaction techniques do not allow for effective tactile to control of a particular portion or single part of the mobile apparatus.

There were several attempts to develop haptic apparatus for pen-style devices. However, most of these interfaces were based on using external force-producing mechanisms (usually motors) attached to pen. The motion of the pen would be restricted by the motors so when the user was operating the pen he would feel pen resisting user motion. An example is a Phantom haptic device produced by Sensible Technologies or other pen style force feedback devices (P. Buttolo, B. Hannaford, 'Pen Based Force Display for Precision Manipulation of Virtual Environments,' Proceedings VRAIS-95, pp. 217-225, Raleigh, N.C., March 1995.)

These devices, however, are large, heavy and cannot be easily moved from one workplace to the other. They also usually do not consider interaction design with these devices.

SUMMARY OF THE PRESENT INVENTION

As described above, the tactile feedback techniques in the related art may not provide the most effective tactile feedback mechanism for a mobile apparatus or a pen-type apparatus that is used with an information processing apparatus for inputting data therein.

It is, therefore, desirable to provide an apparatus that can present more effective tactile feedback through user interactions. The apparatus may include a haptic device/display, a mobile apparatus, a system including an information processing apparatus and a pen-type apparatus for inputting data therein.

Furthermore, it is desirable to provide an apparatus that can produce a variety of arbitrary tactile feedback patterns with lesser latency.

It is also desirable to provide an apparatus that can realize more effective tactile control for a mobile apparatus In view of the above problems, there is provided a mobile apparatus having tactile feedback function comprising:

a data processing unit for executing data processing operation;

a signal producing unit for producing the signal that is a voltage function of time, with amplitude, shape and period defined by the resultant data from the data processing unit; and a haptic display for generating immediate tactile pattern, to be communicated to the user who touches the mobile apparatus, in accordance with the signal applied by the signal producing unit.

With the mobile apparatus according to the first aspect of the invention, it is possible to give user effective tactile feedback through the user interaction.

The force patterns can be freely changed by applying arbitrary control signal to the haptic display. The signal producing unit generates, in accordance with the resultant data from the data processing unit, the control signal that is a voltage function of the time.

The mobile apparatus according to the present invention may further comprise a user input device for receiving data or command inputted by the user. In this case, the data processing unit handles the inputted data or command, and the signal producing unit generates the signal influenced by the inputted data or command. Resultantly, the haptic display can give the tactile feedback in accordance with the user-input-operation.

The haptic display may be constituted by a bending actuator. More specifically, it may comprise a multi-layered piezoelectric bending actuator, that has an upper layers of piezoelectric actuators and a lower layers of piezoelectric actuators.

The piezoelectric material can either expand or contract in accordance with the direction of the applied voltage. By applying voltage of the opposite direction to the upper and lower layers, the upper layer contracts and the lower layer expands at the same time. Resultantly, the multiple layer piezoelectric bending actuator bends upward or downward as a whole.

Alternatively, the haptic display may include one or more bending-type actuators. The bending-type actuator may include a beam portion preferably with a plate-like form, and bend in response to the signal outputted from the signal producing unit.

Preferably, the bending-type actuator may be a multi-layered piezoelectric bending actuator that has layers of piezoelectric material and electrodes. Each of the layers of piezoelectric material is sandwiched by a pair of electrodes.

Examples of the multi-layered piezo electric bending actuator are disclosed in, for example, non-published Japanese Patent Application JP 2002-25178, filed on Aug. 29, 2002 and assigned to same applicant of this application. The entire disclosure of the art is incorporated herein.

Furthermore, the multi-layered piezoelectric bending actuator may include a first bending actuator unit, second bending actuator unit and a common electrode layer sandwiched between the first and second bending actuator units. Each of the bending actuator units has a multi-layered configuration with a plurality of piezoelectric layers and electrodes. The first and second bending actuator units may be driven in such a way that an overall construction of the first bending actuator unit contract when the second bending actuator unit expand or vise versa.

The piezoelectric material may be piezoelectric ceramics such as PZT or any other material that exhibits the piezoelectric property, i.e. converts electric energy to mechanical energy.

It would be appreciated that the value $\Delta Y$ of the multiple layer piezoelectric bending actuator is much larger than the longitudinal contraction and expansion of the each layer. The multiple layer piezoelectric bending actuator consumes lower power, and can activate with very small latency. And, most important, this actuator requires significantly lower voltage for its operation (5-10V) which allows to control it from the battery. The traditional 2-layers actuators (bimorphs) require at least 40V voltage which makes them inappropriate for small battery-powered devices.

By using the multiple layer piezoelectric bending actuator, it is possible to form the haptic display into small and thin chip.

The haptic display may be located anywhere in the mobile apparatus. In response to the user-input-operation or in accordance with the data processing result, the body of the mobile apparatus gives the user the immediate tactile feedback having a wave of any shape.

The haptic display may be attached to a movable part or deformable part of the mobile apparatus. If such part is suspended on the apparatus body, only this part among the apparatus body can provide tactile feedback.

The haptic display may also attached so as to actuate a movable part of the mobile apparatus. For example, it can be embedded under the touch panel display.

The haptic display may include a plurality of haptic devices each of which generates tactile pattern independently.

A plurality of the haptic displays may be located within the body of the mobile apparatus, attached to movable parts or actuate movable parts of the mobile apparatus.

By providing the haptic devices under the respective button area displayed on the display screen, it is possible to stimulate the specific button in response to the user-input-operation and directly give the user's finger the tactile feedback.

Alternatively, various graphic elements may be displayed on the display screen instead of the button in order to accepts user's input operation.

The signal producing unit can apply arbitrary electric signal to the haptic display so that the force patterns can be changed. The signal producing unit may also generates signal of the voltage function that expresses the resultant data from the data processing unit.

The haptic apparatus can be embedded into the pen that is used for data input in information processing systems where visual screen is enhanced with pen input capability. The user can control information system by interacting with screen interface using a pen. The user will then receive tactile feedback from the pen. Another possibility is when a separate tablet-style input device is used for interaction.

More specifically, a pen-type apparatus enhanced with the haptic actuator may be used in combination with on-screen visual interface to facilitate input and control of data in computer systems, such as tablet-type computers, touch screens, as well as any other computing devices that facilitate the use of the pen-type apparatus as an input device.

The present invention is not limited to the pen-type apparatus, and may also be applicable to any other type of input device that is held by the user.

The tactile feedback provided through the pen-type apparatus may be used to aid user in selecting small elements of graphical object comprised in the visual interface, such as slider controls, controls for creating graphics such as Bezier curves.

The tactile feedback provided through the pen-type apparatus may allow the user to feel elements of graphical object comprised in the visual interface before operating and modifying them.

The tactile feedback provided by haptic apparatus may be comprised of different wave shapes, the wave shapes depend on the screen interface elements that the user interacts with, such as graphical buttons, sliders, check boxes, graphical controls for moving interface elements on the screen, controls for creating and modifying computer graphics objects such as curves and others. Therefore, there is a strong correspondence between the visual interface and haptic feedback that the user received from the pen.

One particular method of interaction with interface elements is when tactile feedback is provided before the user start interacting with a graphical control, and then different tactile feedback is provided after the user started interacting with graphical controls.

According to another aspect of the present invention, there is provided a system including a main apparatus having a visual interface function and a data input apparatus to be used in combination with the visual interface function. The system further includes; a data processing unit for executing data processing operation; a signal producing unit for producing a signal having a waveform defined by resultant data of the data processing operation in the data processing unit; one or a plurality of haptic actuator for generating tactile pattern, which is to be communicated to a user who touches the data input apparatus, in accordance with the signal produced in the signal producing unit; and an input/output unit for visual displaying data and detecting data input performed by the data input apparatus. Furthermore, the haptic actuator is placed in the data input apparatus, and the haptic actuator comprises a bending-type actuator having a multi-layer configuration.

The data input apparatus may be used for selecting an element of graphical object visually displayed on the input/output unit. Furthermore, the data input apparatus may provide tactile feedback before operating and/or modifying selected element of graphical object. Furthermore, the data input apparatus may provide different tactile feedback depending on an attribute of selected element of graphical object.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIGS. 15A and 15B show example of the multi-layered piezoelectric bending actuator.

DETAILED DESCRIPTION OF THE PREFERRED EMBODIMENT

Figure 1:
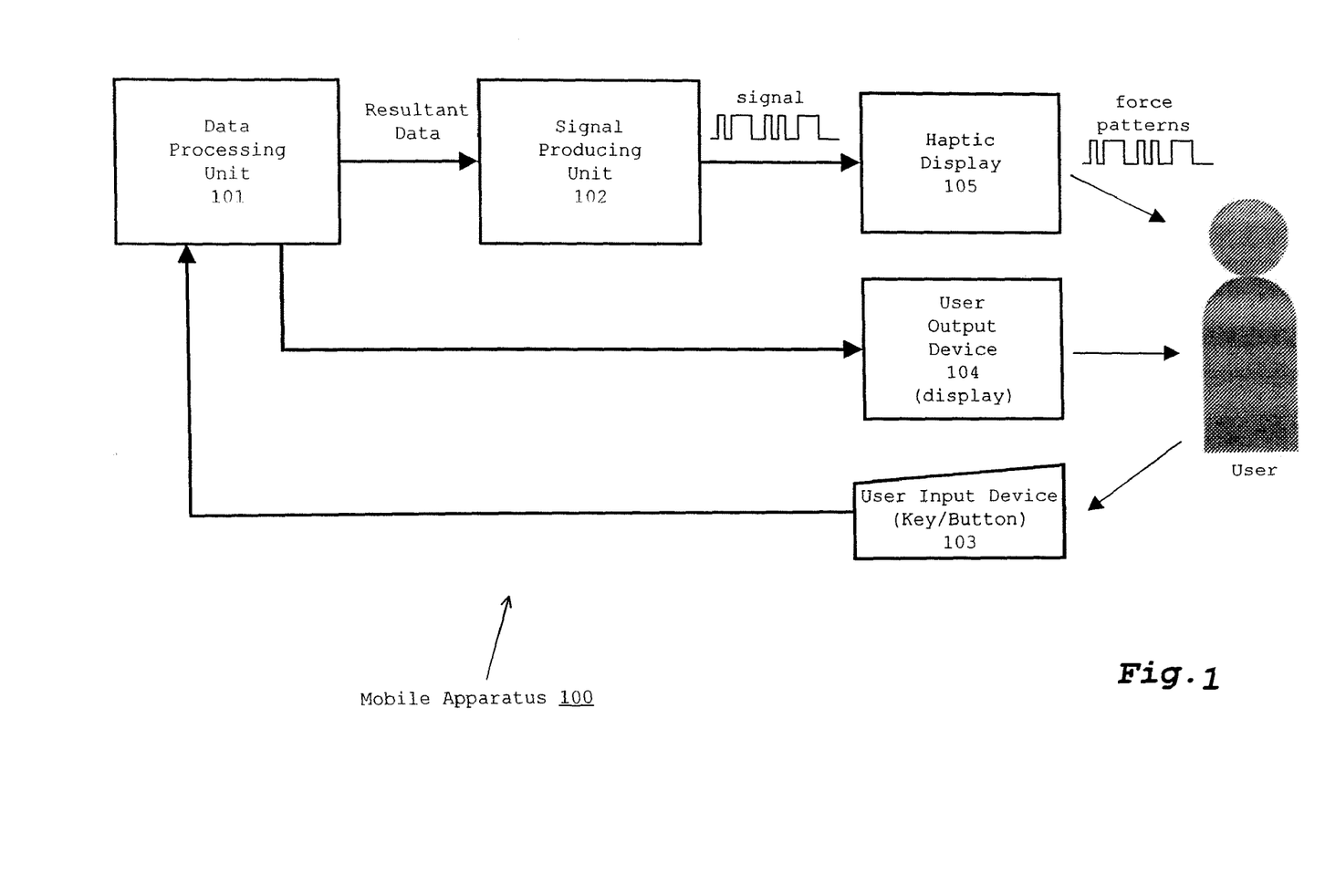
FIG. 1 depicts a schematic diagram showing a hardware configuration of a mobile apparatus 100 embodying this invention.

FIG. 1 schematically shows a hardware configuration of a mobile apparatus 100 embodying this invention. As shown in this figure, the mobile apparatus 100 includes a data processing unit 101, a signal producing unit 102, a user input device 103, a user output device 104, and a haptic display 105.

The data processing unit 101, acting as a main controller, executes a variety of application programs under the environment provided by the operating system (OS). In general, application programs run through user interaction. In this embodiment, some of the application programs use tactile feedback function as described below. The data processing unit 101 can be constructed by microprocessor with RAM (Random Access Memory) and ROM (Read Only Memory).

The user input device 103 may be a keyboard or keypad, and the user output device 104 may be a flat panel type display like LCD (liquid crystal display). Both the user input device 103 and the user output device 104 may be also integrated into a single device such as touch panel display.

In response to the user input data/command through the user input device 103, the data processing unit 101 operates and the provides the resultant data to the user output device 103 and signal producing unit 102 respectively.

The signal producing unit 102 generates or modulates, in accordance with the resultant data provided by the data processing unit 101, the signal that is a voltage function of time, with amplitude, shape and period defined by the interface designer. The example of the generated signal is square wave, sinusoidal and so on. The signal producing unit outputs the signal into the haptic display 105.

The haptic display 105 converts the signal from the signal producing unit 102 into the force or tactile pattern. The patterns are communicated to the user who holds the mobile apparatus 100 on his/her palm.

The mobile apparatus 100 may also install the other electric circuits and peripheral devices such as hard disk and network interface. However, these components are not depicted in the figure, since they are well known in the art and yet they do not pertain to the gist of this invention.

The haptic display 105 comprises at least one haptic device that can give tactile feedback on behalf of visible feedback. Each of the haptic devices converts the signal from the signal producing unit 102 into the force or tactile pattern.

Basically there are two ways to provide feedback using the haptic device.
1) By placing it anywhere inside of the device. This construction would require mass
2) By actuating a part of the display without using mass.

As described later, the haptic device does not require mass, so that it can be provided on almost any portion or part within the body of the mobile apparatus. For example, the haptic device can be embedded under the touch panel display that constitutes both the user input device 103 and the user output device 104. By providing the haptic devices under the respective button area displayed on the touch panel display, it is possible to stimulate the specific button in response to the user-input-operation and directly give the user's finger the tactile feedback.

Figure 2:
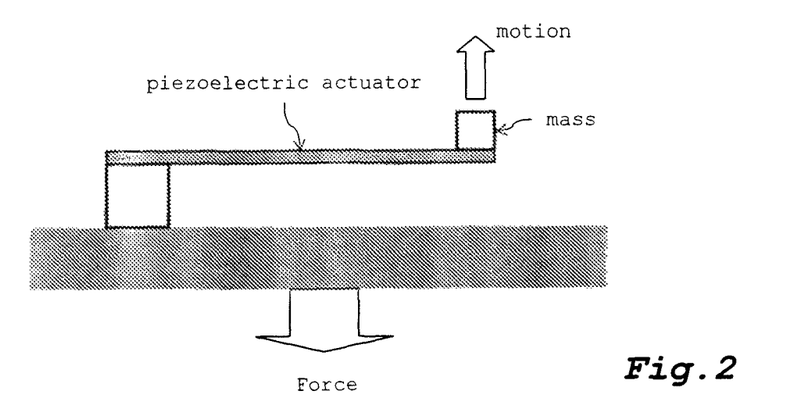
FIG. 2 schematically shows a physical configuration of the haptic device.

FIG. 2 illustrates a physical configuration of the haptic device. This type of haptic device comprises a bending piezoelectric actuator that is rigidly supported on one end with the mass attached to the other end.

Figure 3:
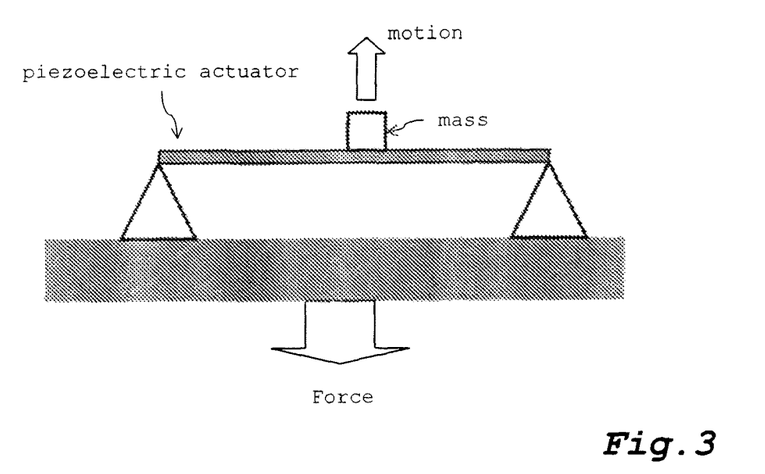
FIG. 3 illustrates anther example of the structure of the haptic device.

FIG. 3 illustrates anther example of the structure of the haptic device. This type of haptic device comprises a bending piezoelectric actuator that is rigidly supported on both ends (bridge configuration) with the mass attached in the middle.

Figure 4:
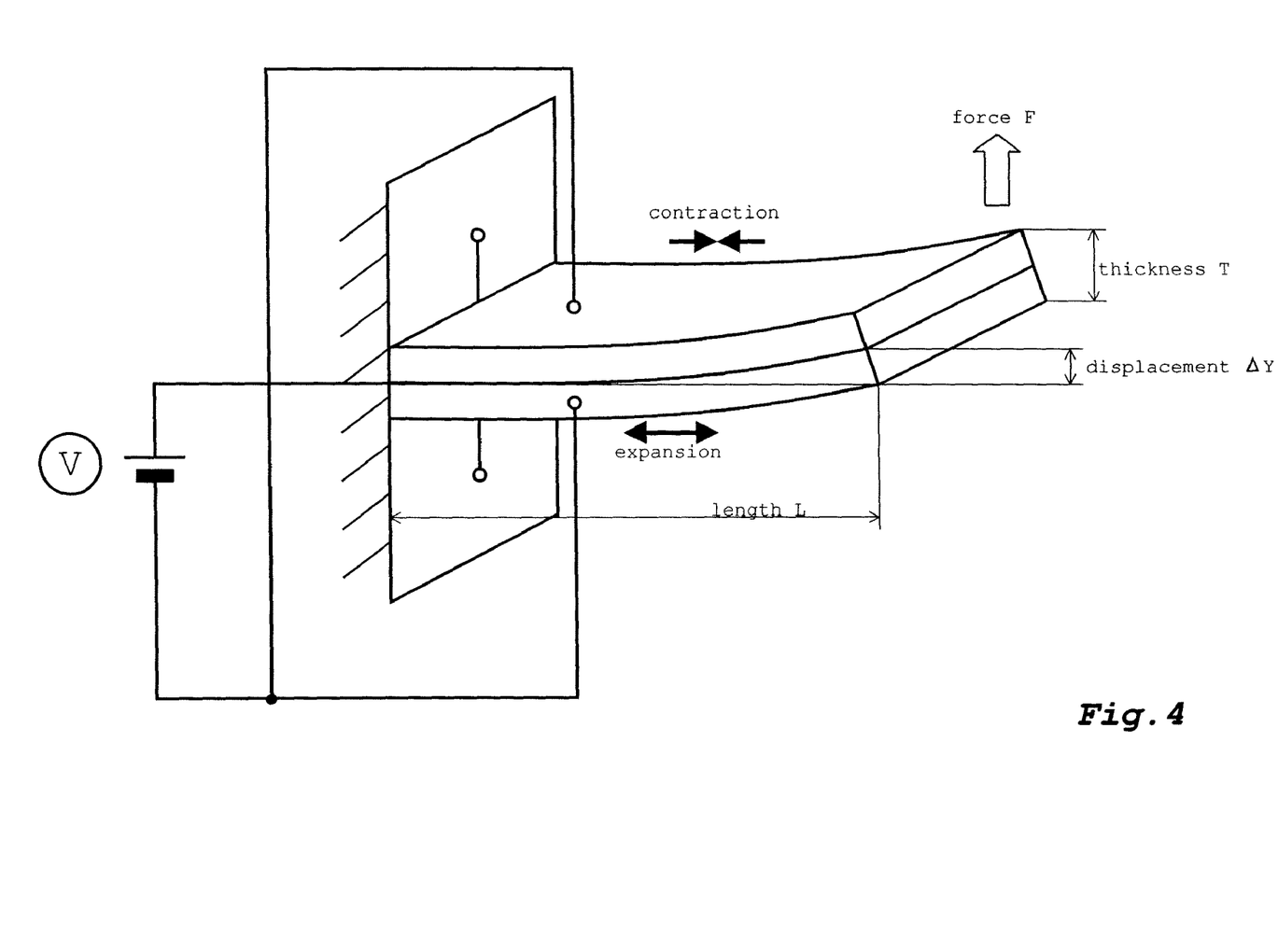
FIG. 4 schematically shows the structure and the principle of the operation of the multiple layer piezoelectric bending actuator.

In this embodiment, the haptic device comprises single or multiple layer piezoelectric bending actuator. FIG. 4 schematically shows the structure and the principle of the operation of single or multiple layer piezoelectric bending actuator. As shown in this figure, the multiple layer piezoelectric bending actuator comprises the upper layer piezoelectric actuator and the lower layer piezoelectric actuator. The piezoelectric actuator can either expand or contract in accordance with the direction of the applied voltage. By applying, to the upper layer, a certain voltage of the direction opposite to the lower layer, the upper layer contracts and the lower layer expands at the same time. Resultantly, the multiple layer piezoelectric bending actuator bends upward or downward as a whole.

The displacement value ΔY of the piezoelectric bending actuator and the force F generated by the piezoelectric bending actuator are directly proportional to voltage applied to the actuator. More specifically, they may be calculated, for example, by using the following formulas for the example shown in FIG. 4.

The displacement value ΔY of the multiple layer piezoelectric bending actuator can be calculated by using the following formula.

$$\Delta Y = k_1 \cdot d_{31} (L/t)^2 \cdot V$$

$k_1$: correction constant value
$d_{31}$: piezoelectric constant value
L: length of the actuator
t: thickness of one layer of the actuator
V: voltage applied to the actuator It would be appreciated that the value ΔY is much larger than the longitudinal contraction and expansion of the each layer.

The force F generated by the multiple layer piezoelectric bending actuator can be calculated by using the following formula.

$$F = k_2 \cdot d_{31} \cdot T/(W \cdot E \cdot L) \cdot V$$

$k_2$: correction constant value
W: width of the actuator
E: longitudinal elastic coefficient
T: thickness of the actuator The piezoelectric bending actuator has a fast tactile bandwidth so that it can be used into tactile feedback device. The piezoelectric bending actuator can activate with very small latency so that it can be used in interactive tactile feedback application.

The multiple layer piezoelectric bending actuator consumes lower power and very low voltage is required. By using the multi-layered piezoelectric bending actuator, it is possible to form the haptic device into small and thin chip.

The haptic device can generate the force by using the principles of the conservation of momentum, for example an isolated system with no external force, the total momentum of the system is zero. Therefore, when a periodic voltage is applied to the piezoelectric actuator (for example a square wave), it bends, moving attached mass up or down very rapidly. According to the principles of conservation of momentum, when the attached mass moves with momentum pa the entire device would move with the equal momentum pd in opposite direction, generating force on the user hand that holds the device on his/her palm:

$$\vec{p}_a = -\vec{p}_d$$

$$F_d = \frac{d\vec{P}_d}{dt}$$

$$= -\frac{d\vec{P}_a}{dt}$$

$$= -m\frac{dv_a}{dt}$$

Therefore, the user would feel force applied on the user's hand that touches the device. The haptic device can act as the haptic display 105 by being installed into the mobile apparatus as described later.

The haptic display can be formed as a small and thin chip as described above, it can be installed into the mobile apparatus of the other type much smaller than PDAs.

FIG. 15A and FIG. 15B show other examples of the multi-layered piezoelectric bending actuator. FIG. 15A is an exploded diagram showing an inner structure of the actuator, and FIG. 15B is schematic view of the actuator in a completed form.

The multi-layered piezoelectric bending actuator shown in FIG. 15A has 2n-layers of piezoelectric thin films with electrodes sandwiching the films in between. Every other electrode is grouped and connected by a pair of parallel electrode connections as shown in the figure.

In the instant example, the multi-layered piezoelectric bending actuator includes fourteen layers of piezoelectric (PZT) thin films (=7+7 layers), a thickness of each piezoelectric thin film being 28 μm and the electrode (Ag—Pb) being 4 μm, resulting in a thin beam of about 0.5 mm thickness, 10 mm width and 30 mm length as shown in FIG. 15B. The multi-layered piezoelectric bending actuator is provided with electrode leads that are connected to the parallel electrode connections.

Figure 5:
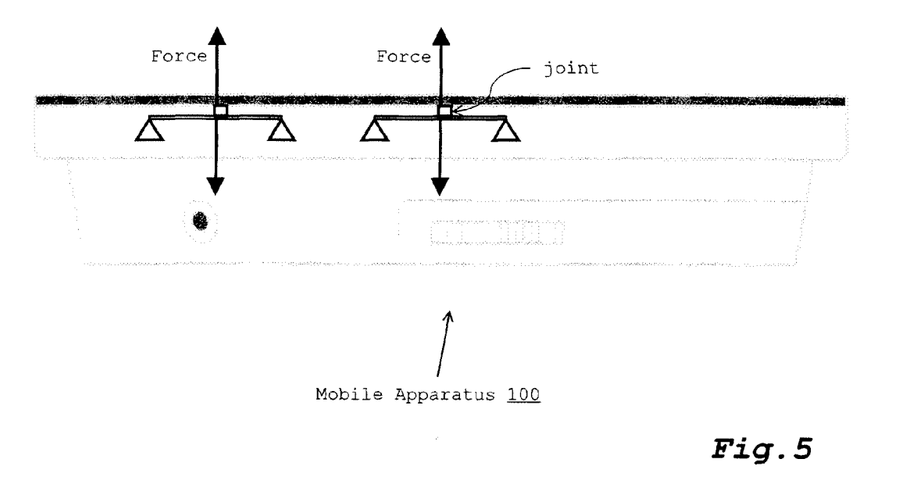
FIG. 5 shows the haptic device as depicted in FIG. 2 and FIG. 3 installed into the flat type mobile apparatus like PDA.
Figures 5A, 5B:
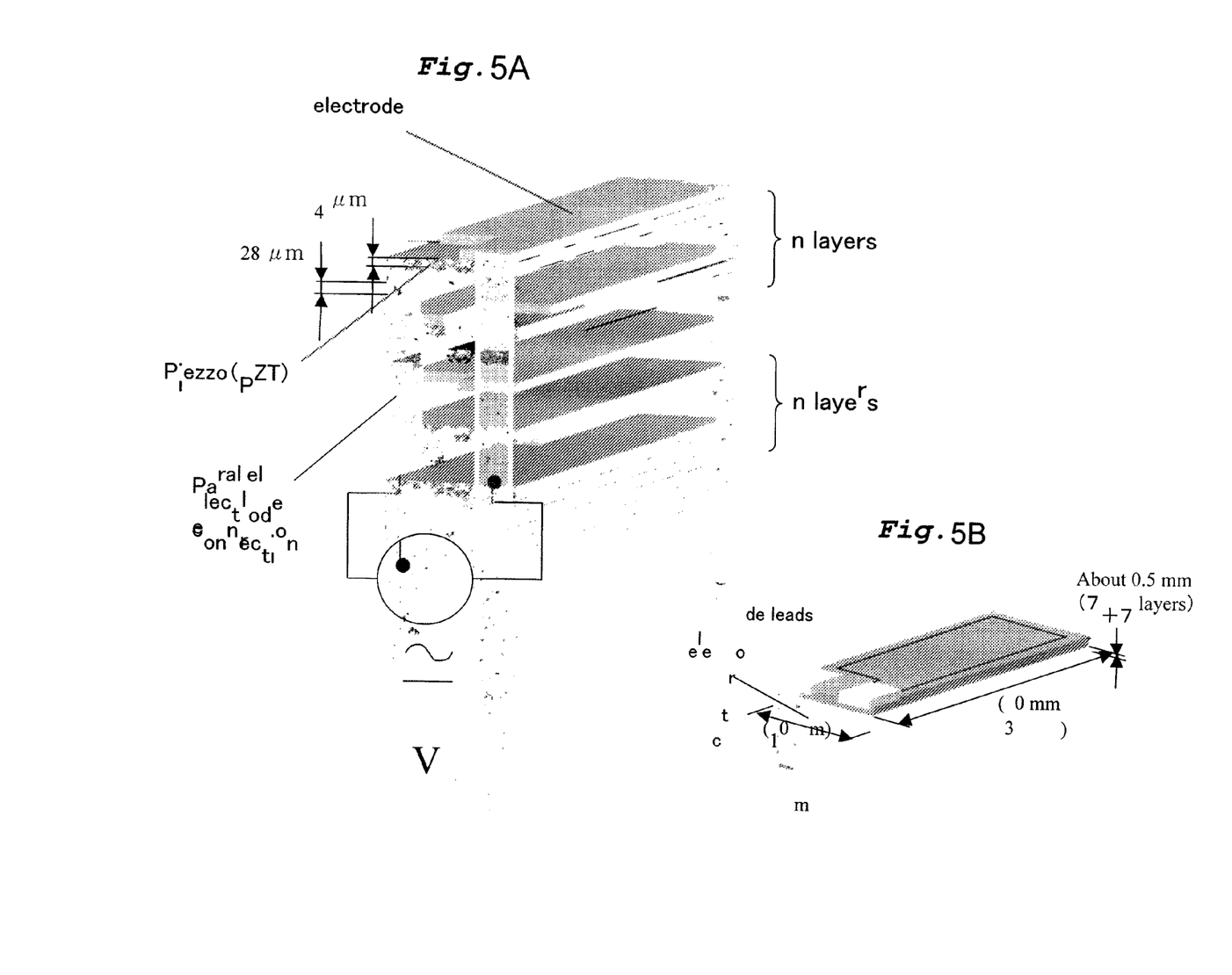

FIG. 5 depicts the flat shaped information handling apparatus, like PDA, that accommodates the haptic display as depicted in FIG. 2 and FIG. 3. The haptic display is attached so as to actuate a movable part of the mobile apparatus. As shown, it is embedded under the touch panel display. In this case, the haptic display can directly apply the tactile pattern to the user's finger that touches the area where it lies.

Figure 6:
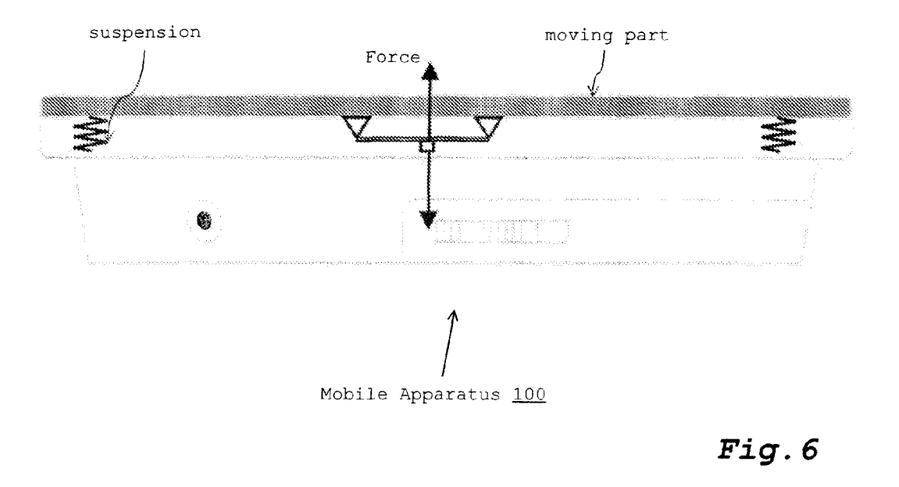
FIG. 6 also shows the haptic device as depicted in FIG. 2 and FIG. 3 installed into the flat type mobile apparatus like PDA.

FIG. 6 also depicts the flat shaped information handling apparatus, like PDA, that accommodates the haptic display as depicted in FIG. 2 and FIG. 3. The haptic display is attached to a movable part of the mobile apparatus. As shown, the movable part is freely suspended on the apparatus body through the springs. The movable part can outwardly transmit the tactile pattern generated by the haptic display.

Figure 7:
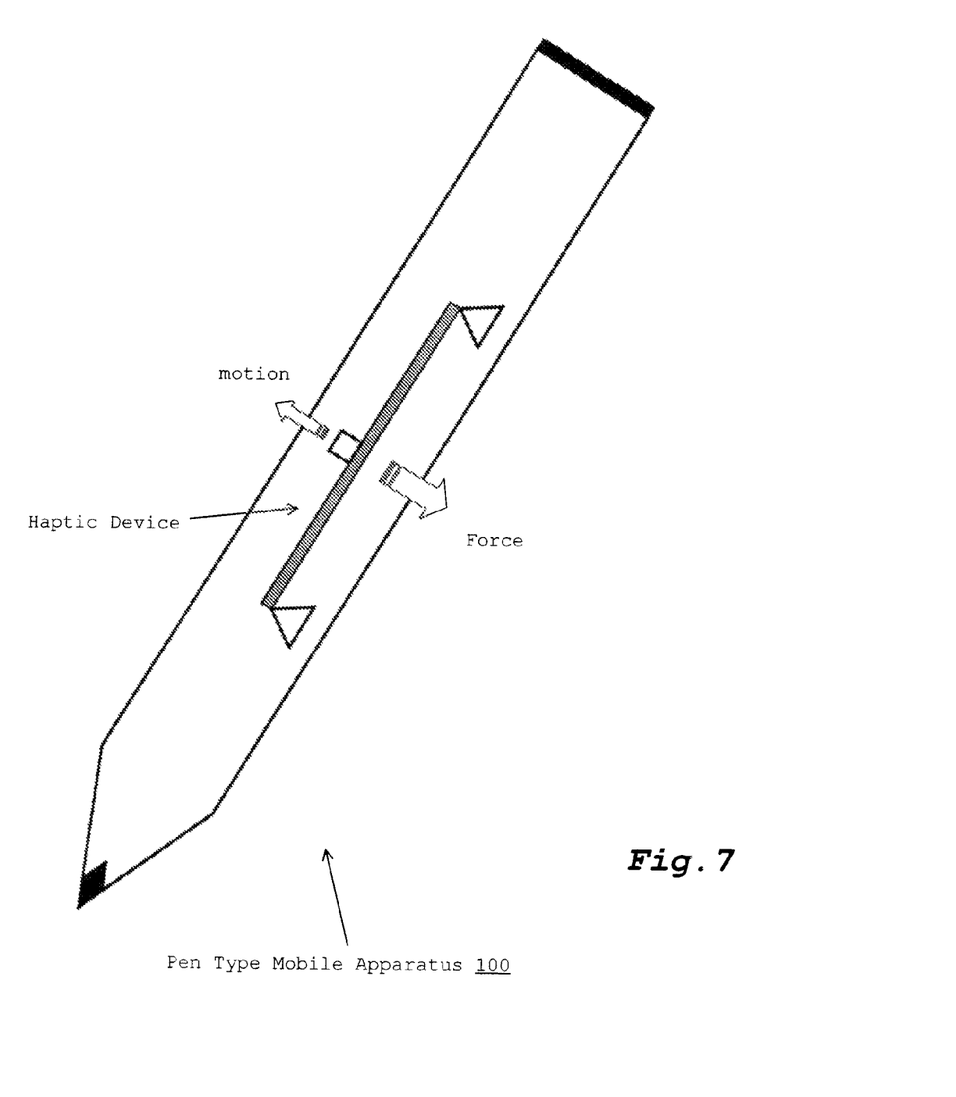
FIG. 7 depicts the pen type information handling apparatus that accommodates the haptic display.
Figure 8:
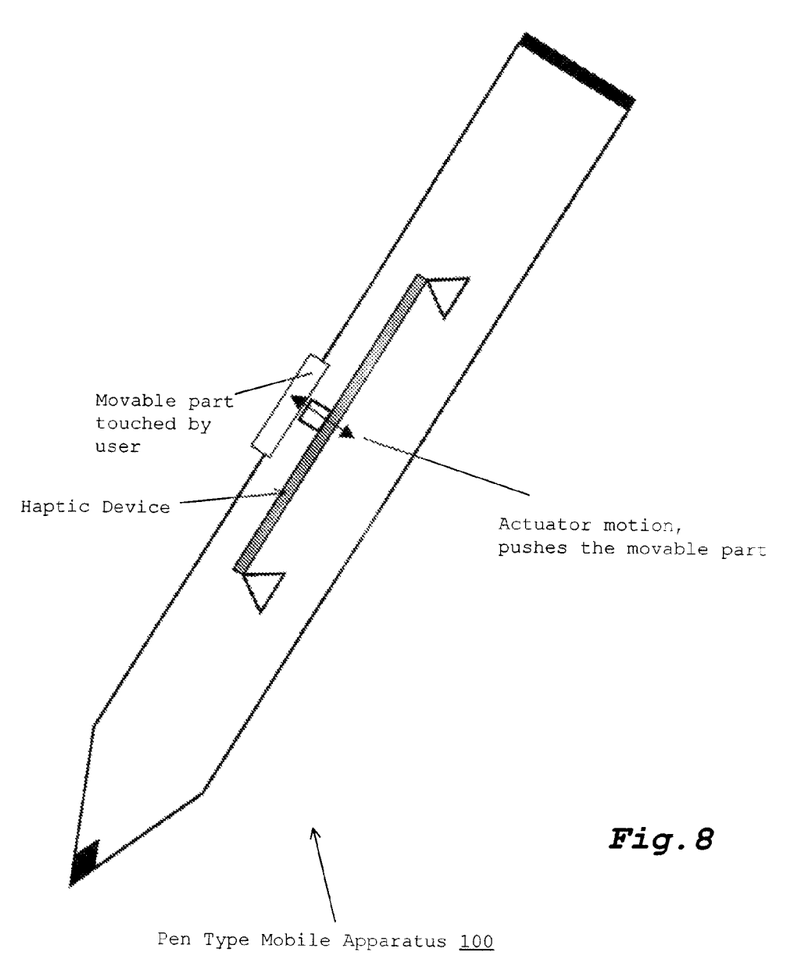
FIG. 8 depicts the pen type information handling apparatus that accommodates the haptic display.

FIG. 7 and FIG. 8 depict the pen type information handling apparatus that accommodates the haptic display. The pen type apparatus can directly apply the tactile pattern to the user who grasps the pen.

FIG. 7 depicts the pen type apparatus where haptic display is installed anywhere inside of the pen and which rapid motion create force impulses that are felt by the user hands.

FIG. 8 depicts the pen type apparatus where haptic display is installed under the movable part on the body of the pen. Motions of the haptic actuator move, or push the movable part and these movements are felt by the user holding the pen.

Figure 9:
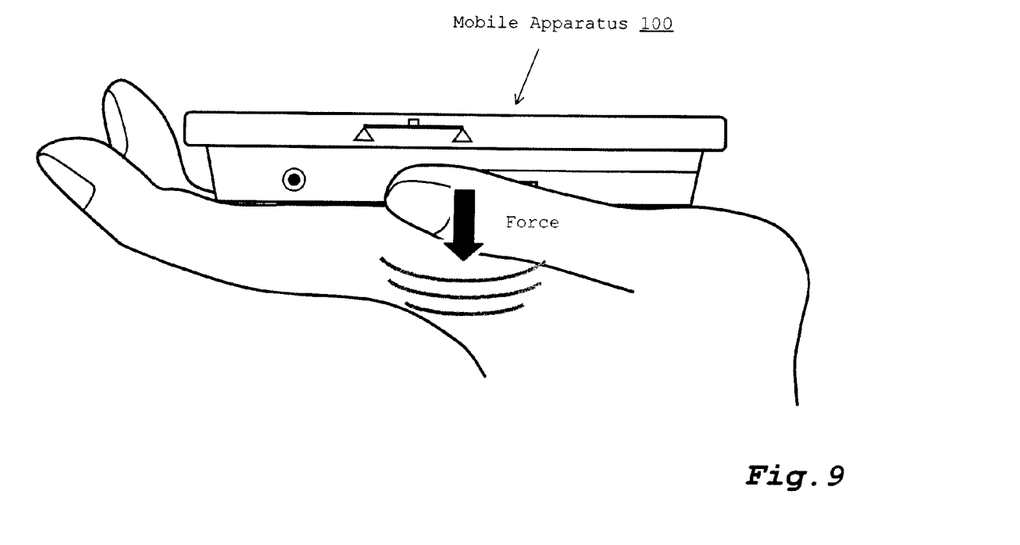
FIG. 9 depicts the mobile apparatus, that installs the haptic display 105, applies the force on the user's hand that holds the apparatus.

FIG. 9 shows the mobile apparatus, that installs the haptic display 105, applies the force on the user's hand that holds the apparatus.

The haptic display has a fast tactile bandwidth so that it can be used into tactile feedback device. It can also activate with very small latency so that it can be used in interactive application.

The haptic device can be attached to the mobile apparatus in two ways.

First, it can be located anywhere in the mobile apparatus and the whole of the apparatus works as a force/tactile display as shown in FIGS. 6, 7, and 8. In response to the user-input-operation or in accordance with the data processing result, the body of the mobile apparatus gives the user the immediate tactile feedback having a wave of any shape.

Second, the haptic device can be attached to some movable part of the hand-held apparatus. For example, it can be embedded under the touch panel display screen so that it constitutes the haptic display. If such portion is suspended, only the portion among the body can provide tactile feedback. In this case, the tactile feedback can also have any wave of shape by changing the voltage function of the signal applied to the haptic device.

Figure 10:
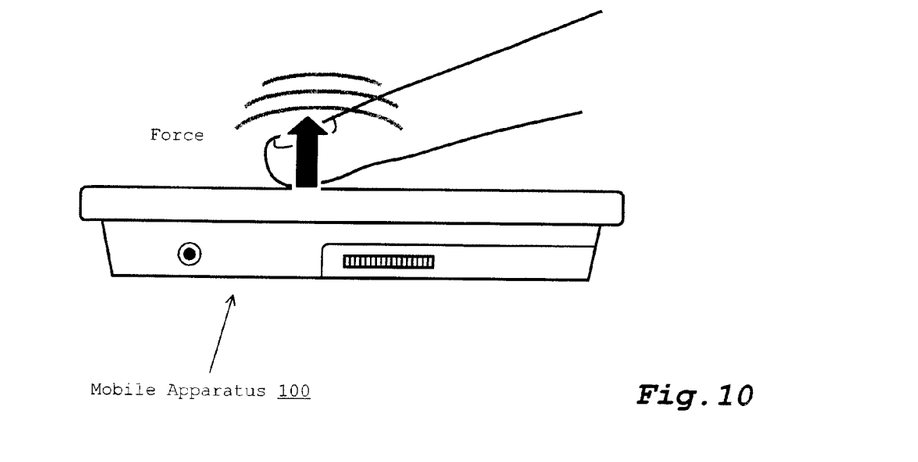
FIG. 10 shows the display screen that embeds the haptic device and applies the immediate tactile feedback directly to the user's finger.

FIG. 10 shows the display screen that embeds the haptic device and applies the immediate tactile feedback directly to the user's finger. By providing the haptic devices under the respective button area displayed on the touch panel display, it is possible to stimulate the specific button in response to the user-input-operation and directly give the user's finger the tactile feedback.

The force patterns can be freely changed by applying arbitrary control signal to the haptic display. The signal producing unit 102 generates, in accordance with the resultant data from the data processing unit 101, the control signal that is a voltage function of the time.

The force pattern can also be adjusted by changing the mass to be mounted on the piezoelectric actuator (see FIG. 2 and FIG. 3). This can increase or decrease the speed of movement, and change force by changing momentum.

The haptic device of this embodiment is developed specifically as the user interface to be used into mobile or hand-held apparatus, such as PDAs, mobile phones, wearable computers, remote controls for personal musical machines, pen input based apparatus and so on. The reason is that the resulted tactile display is very small and can be installed even in very small appliances, such as remote controls for MD players.

Figure 11:
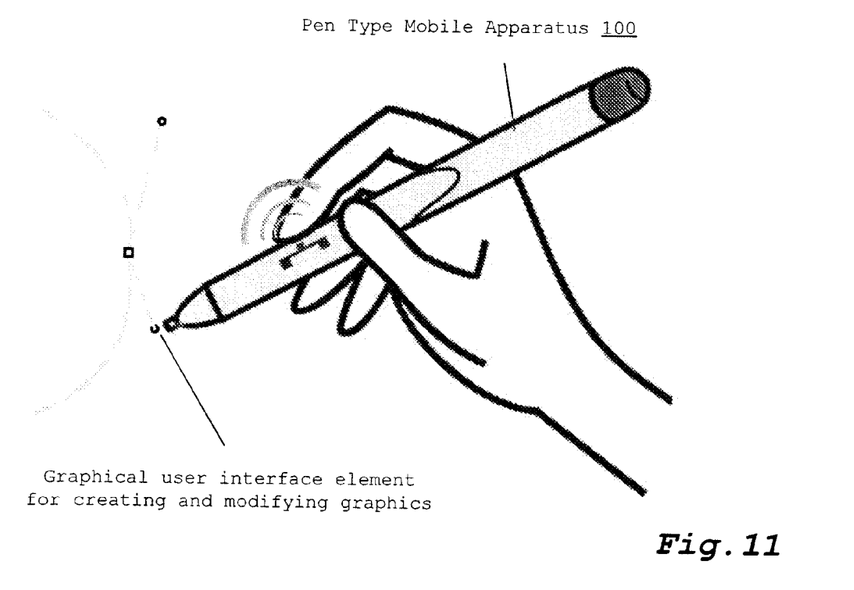
FIGS. 11, 12, and 13 show the examples of combination of graphical user interface and tactile feedback communication.

When haptic device is used for information processing apparatus that has visual screen, such as tablet computers, PDA and others, the haptic feedback should be closely linked to the on-screen user interface. The tactile apparatus can provide different tactile response for different interface elements. FIG. 11 shows an example for the user changing the shape of the curve by manipulating the small user interface controls. Tactile feedback is provided when user touches the user interface controls with a pen.

Figure 12:
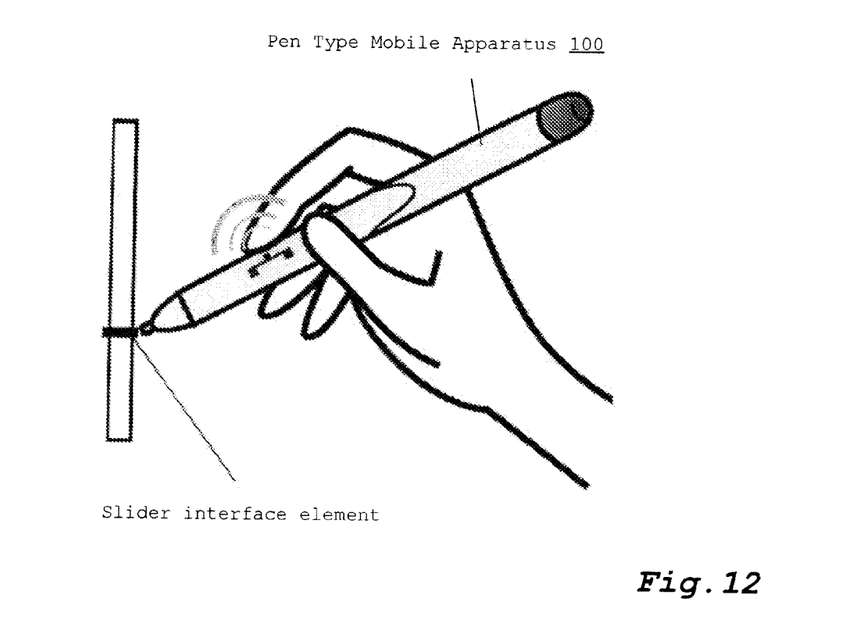

FIG. 12 shows another example when user moves a slider user interface element and tactile feedback is provided when user selects the slider control element as well while the user moves it on the screen.

Figure 13:
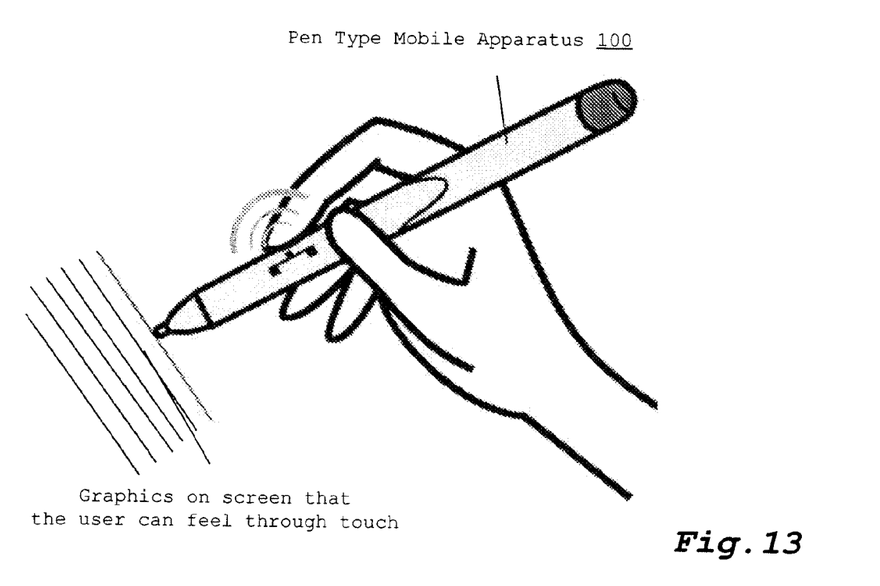

FIG. 13 shows the user touching the graphical information on screen such as lines, when the user touched lines with the pen a tactile feedback is communicated to the user through the pen.

Figure 14:
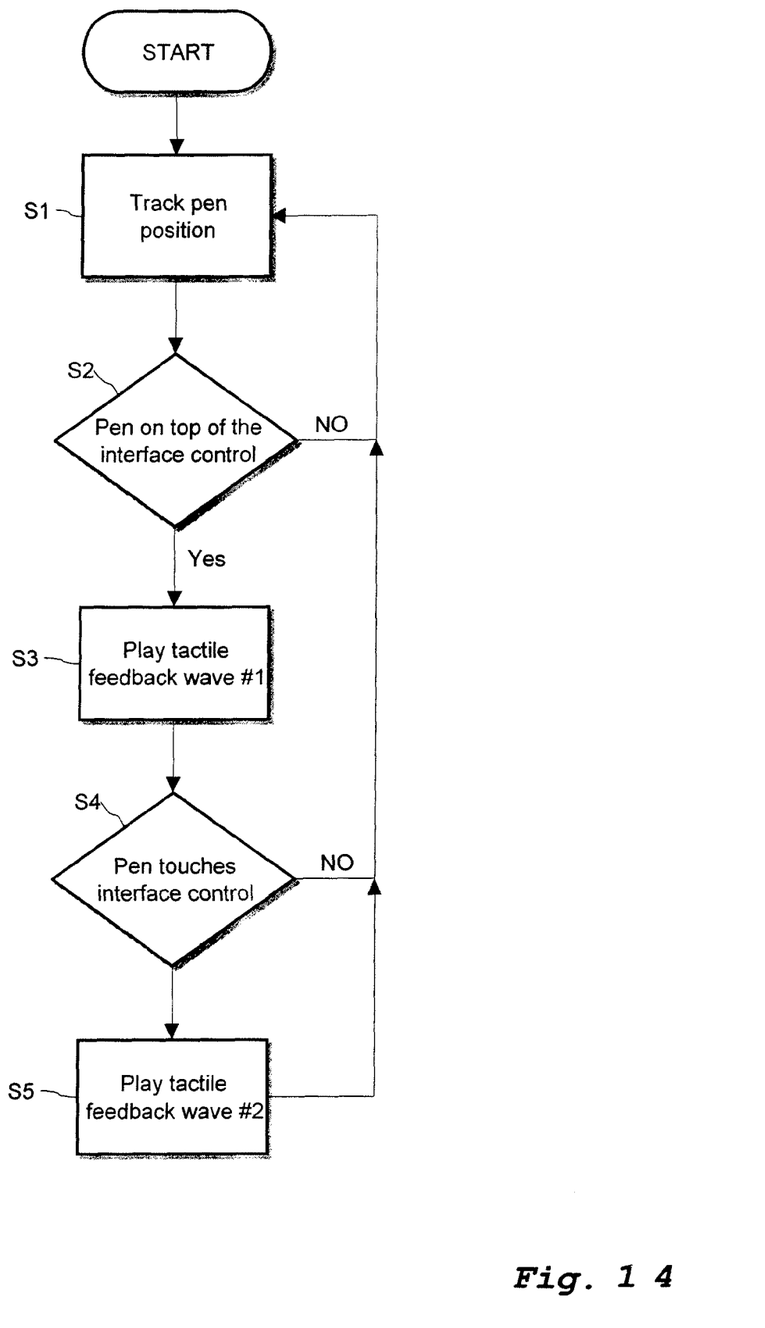
FIG. 14 shows a data flow when the user received feedback before interacting with the graphical user interface.

The user can receive feedback before interacting with on-screen user interface elements. FIG. 14 shows the data flow diagram for such interaction. The pen position is monitored (step S1). When the pen input detects that the pen is over a interface element (step S2), a tactile feedback is communicated to the user informing that the user can select this element (step S3). When the user proceeds to select the element another (step S4), different tactile feedback pattern is communicated to the user to inform him that the interaction is started with the graphical user interface (step S5). This makes it easier to select graphical user interface element that the user wants to interact with.

A system for realizing the user interaction shown in FIG. 14 may have the same construction as shown in FIG. 1 except that the haptic display 105 is included in a pen-type apparatus separately provided from the main part of system. The main part of the system may include the data processing unit 101, the signal producing unit 102, the user output device 104 and the user input device 103. In this example, the user output device 104 and the user input device 103 constitutes the touch panel display accepting data input and/or operation by the pen-type apparatus with the haptic display 105.

The main part of the system and the pen-type apparatus may further include wired or wireless communication units for sending the signal from the signal producing unit 102 to the haptic display 105 so as to cause appropriate tactile feedback in accordance with a position of the pen-type apparatus on the touch panel display.

Alternatively, the signal producing unit 102 may be placed in the pen-type apparatus, and the communication units transmits and receives the resultant signal from the data processing unit 101. The resultant signal is inputted to the signal producing unit 102 placed in the pen-type apparatus.

The use of different tactile feedback pattern for different graphical interfacing elements may also be employed in applications that do not uses the pen-type apparatus. For example, the different tactile feedback pattern may be similarly generated at the touch panel display equipped with the tactile devices depending on the graphical interfacing element selected by the user's finger or any other touching device for selecting and manipulating data.

The present invention has been described with reference to the specific embodiments. However, in view of this disclosure, it will be apparent to those skilled in the art that numerous changes and modifications can be made without departing from the scope and spirit of the invention. Namely, the disclosed invention is to be considered merely as illustrative. In order to judge the summary of the invention, the scope of the claims described should be considered.

As described above in detail, in accordance with the embodiments of this invention, it is possible to provide an improved mobile apparatus that can give user effective tactile feedback through the user interaction.

Further, in accordance with the embodiments of this invention, it is possible to provide an improved mobile apparatus that can create variety of tactile patterns without latency.

Further, in accordance with the embodiments of this invention, it is possible to provide an improved mobile apparatus that allows effective tactile control of a particular portion or single part of the apparatus body.

The mobile tactile display can extend interaction with mobile, hand-held and wearable devices in several important ways. The haptic display embodying the present invention can apply tactile feedback on user manual operation with tactile device. The tactile feedback is significantly faster in comparison with visual and audio feedback, therefore the tactile feedback would be more effective in interfaces with mobile devices that require user manual interaction. For example, it can be used:

a) Tactile feedback for the touch screens, such as PDAs, using finger or pen.

b) Tactile feedback for the gestural interaction with mobile apparatuses, such as tilting interfaces, shaking and other complex gestures.

c) Tactile feedback for any conventional operations, such as button presses.

d) Tactile feedback for drawing operation, such as pen can be augmented with tactile feedback device.

What is claimed is:

1. A mobile apparatus having tactile feedback function comprising:
   a data processing unit configured to execute a data processing operation;
   a signal producing unit configured to produce a signal having information including at least frequency and amplitude defined by resultant data of said data processing operation in said data processing unit; and
   one or a plurality of haptic actuator attached only to a movable part of said mobile apparatus configured to generate a tactile pattern, which is to be communicated to a user who touches said mobile apparatus, in accordance with a combination of said frequency and amplitude.

2. The mobile apparatus according to claim 1, further comprising:
   a user input device configured to receive data or a command inputted by the user,
   wherein said data processing unit processes said inputted data or command, and
   said signal producing unit generates said signal in accordance with said inputted data or command in such a way that said haptic actuator gives tactile feedback in response to user's input operation.

3. The mobile apparatus according to claim 1, wherein said haptic actuator comprises a bending-type actuator having a multi-layer configuration.

4. The mobile apparatus according to claim 3, wherein said bending-type actuator comprises a plurality of piezoelectric layers, and a plurality of electrodes for applying voltage on respective piezoelectric layers.

5. The mobile apparatus according to claim 1, further comprising:
   a display screen configured to display a plurality of graphic objects,
   wherein said display screen includes a plurality of said haptic actuators, said haptic actuators generating tactile pattern independently and being placed under respective areas of said display screen, said graphic objects being displayed at said areas.

* * * * *